United States Patent [19]

De Souza

[11] Patent Number: 5,487,832
[45] Date of Patent: Jan. 30, 1996

[54] FILTER DESIGN

[75] Inventor: Dacio M. De Souza, Sao Paulo, Brazil

[73] Assignee: Brasfilter Industria E Comercio Ltd., Sao Paulo, Brazil

[21] Appl. No.: 219,811

[22] Filed: Mar. 29, 1994

[51] Int. Cl.[6] .......................... B01D 35/30; B01D 35/34
[52] U.S. Cl. .................. 210/232; 210/323.2; 210/335; 55/490
[58] Field of Search ........................ 210/232, 323.2, 210/333.01, 333.1, 340, 341, 443, 348, 335; 55/490

[56] References Cited

U.S. PATENT DOCUMENTS

| | | |
|---|---|---|
| 948,180 | 2/1910 | Marie . |
| 2,592,431 | 4/1952 | Kinney . |
| 3,333,703 | 8/1967 | Scavuzzo . |
| 3,768,654 | 10/1973 | Pearle . |
| 4,369,113 | 1/1983 | Stifelman . |
| 4,608,166 | 8/1986 | Cain . |
| 4,701,258 | 10/1987 | Billiet . |
| 5,024,760 | 6/1991 | Kemper . |
| 5,128,034 | 7/1992 | Kool . |

Primary Examiner—Thomas M. Lithgow
Attorney, Agent, or Firm—Steinberg, Raskin & Davidson

[57] ABSTRACT

A filter device is comprised of a monoblock piece (1) made up of two cylindrical bodies (2) set to horizontal plates (3) and (3') and vertical plates (4), interconnected on the inside by horizontal ducts (5) for mutual intercommunication and the interconnection of nozzles (6), (7), (8) and (9) set to the piece (1), further provided with internal vertical ducts (10) and lids (11).

5 Claims, 3 Drawing Sheets 5,487,832

FILTER DESIGN

BACKGROUND OF THE INVENTION

Several models of filters are already well known and on the market that are made up of an inner compartment in which two filtering sets are assembled, each made up of a recipient in which several layers of filtering elements are set and through which the water to be filtered flows; on the inside of said compartment there is further mounted a series or ducts used for intercommunication between the two filtering sets as well as their interconnection respectively with the water inlet and outlet nozzles and with the water outlet nozzles for retro-cleaning and purification, with these nozzles mounted on the sides of the compartment. Each interconnection point between the said ducts and the filtering sets as well as between these and the compartment nozzles requires the provision of respective fastening and sealing elements.

As is found in the above description, the normal filters show a high number of movable parts (filtering sets, ducts, nozzles, sealers, "O" rings, etc.), being that these parts require a rather difficult and labored assembly which is carried out over rather long time periods, substantially increasing the cost of the product besides requiring constant maintenance service.

On the other hand, depending on the several interconnection points of the ducts to the filtering sets and the nozzles, there are many places that can develop leaks over time, with the life of conventional filters thus being relatively short.

OBJECTS AND SUMMARY OF THE INVENTION

Aiming at solving these inconveniences, the present "FILTER DESIGN" was created, according to which the two filtering sets, the communication ducts between the two sets, i.e., such that the filterings sets or filters operate in series with one another, the connection ducts between the same and the water inlet and outlet nozzles and the water outlet nozzles for retro-cleaning and purification, and finally the nozzles themselves, all of these parts now become incorporated into a single machine made, cast or injected monoblock, with this piece simply set in the inside of the outside compartment, in which only orifices coinciding with the nozzles of said piece are previously provided; over each one of the filtering sets incorporated into a single piece, a respective lid is provided, similarly comprised of a single machine made, cast or injected piece.

With the new design, the high number of movable parts is now eliminated and consequently the assembly work of the same, substantially reducing the manufacturing time and cost of the product; furthermore possible leakage points, that so much contribute to filter deterioration, were able to be reduced, with the filter consequently now having a substantially longer life and not needing maintenance service.

Finally, the present design managed to make the set more compact since all of the spaces needed before for permitting assembly of the normal movable filter parts were eliminated as a result of the elimination of the movable parts in themselves and consequently the elimination of assembly work.

BRIEF DESCRIPTION OF THE DRAWINGS

For the effects of illustration, there follow drawings of the present model in annex through which the same can be better visualized.

DETAILED DESCRIPTION OF THE INVENTION

Figure 1:
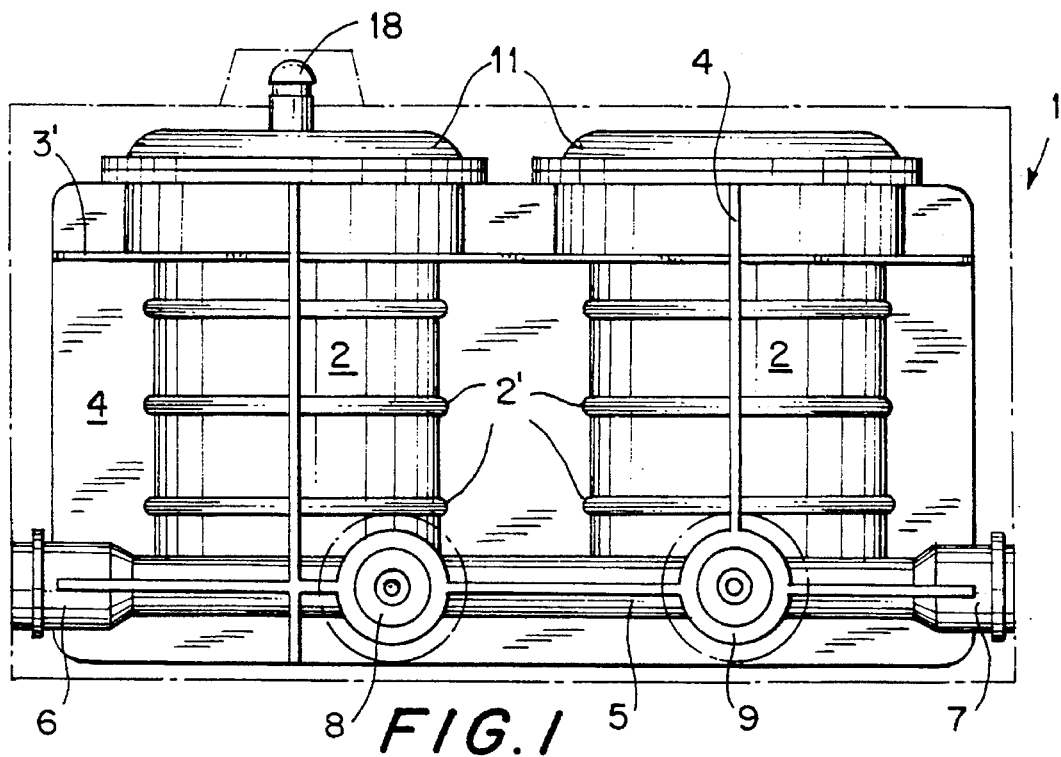
FIG. 1 is a view of the filter given according to the new design showing the monoblock piece with its lids already set in the inside of a normal type compartment drawn in outline.

The present patent relates to a "FILTER DESIGN" according to which the same is comprised of a machine made, cast or injected monoblock piece (1), with this piece made up of two bodies in a cylindrical "water glass" shape (2) whose walls are reinforced by surrounding horizontal ribs (2'), with these bodies set to two rectangular horizontal plates, a lower one (3) and an upper one (3'), whose sizes slightly exceed the diameters of the bodies; such bodies (2) and plates (3) and (3') are further set to vertical plates (4) whose upper edge is fashioned slightly lower than the upper edge of said bodies while its lower edge exceeds the lower horizontal plate (3); said vertical plates (4) are set radially in relation to the bodies (2) and orthogonally to each other in such a manner that they crisscross exactly in the middle of each other under the lower plate (3).

As a constituent part of the piece (1), in other words, made during the machine making, casting or injection of the same, there are provided horizontal ducts (5) in the lower part of the set that establish communication between the two cylindrical bodies (2) as well as the interconnection of these to the water inlet nozzle (6), i.e., an inflow duct and outlet nozzle (7), i.e., an outflow duct and the water outlet nozzles for retro-cleaning (8) and purification (9), with these nozzles similarly set in the piece itself (1), in other words, also made during the manufacture of the same; also, on the bottom of the bodies (2) there are provided vertical ducts (10) similarly set in the piece (1). The water inlet nozzle 6 branches into two separate streams, one leading to the retro-cleaning nozzle 8 and the other leading to the purification nozzle 9. The stream leading to the retro-cleaning nozzle 8 is directed therefrom, when it is open, into a vertical tube 10 in one of the chambers 2 whereas the stream leading to the purification nozzle 9 is directed, when it is open, directly into the bottom of the other chamber.

Both cylindrical bodies (2) are provided with respective lids (11) also comprised of machine made, cast or injected monoblock pieces. One of the lids 11 includes a purified water outflow aperture 18 for removing purified water from the device.

The piece (1) so built is simply set inside a normal type external compartment in which only orifices coinciding with nozzles (6), (7), (8) and (9) of said piece are previously made; then proceeding with the placement of the layers of filtering elements on the inside of the bodies (2) that makeup the two filtering sets of the device.

Figure 2:
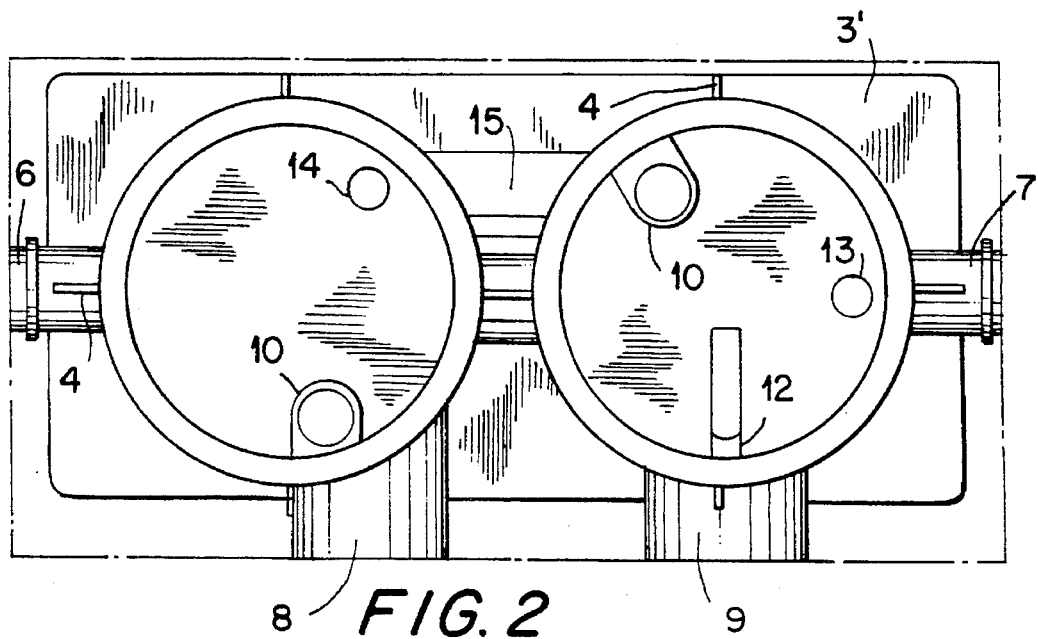
FIG. 2 is a bird's eye schematic view showing the working of the filter.
Figure 3:
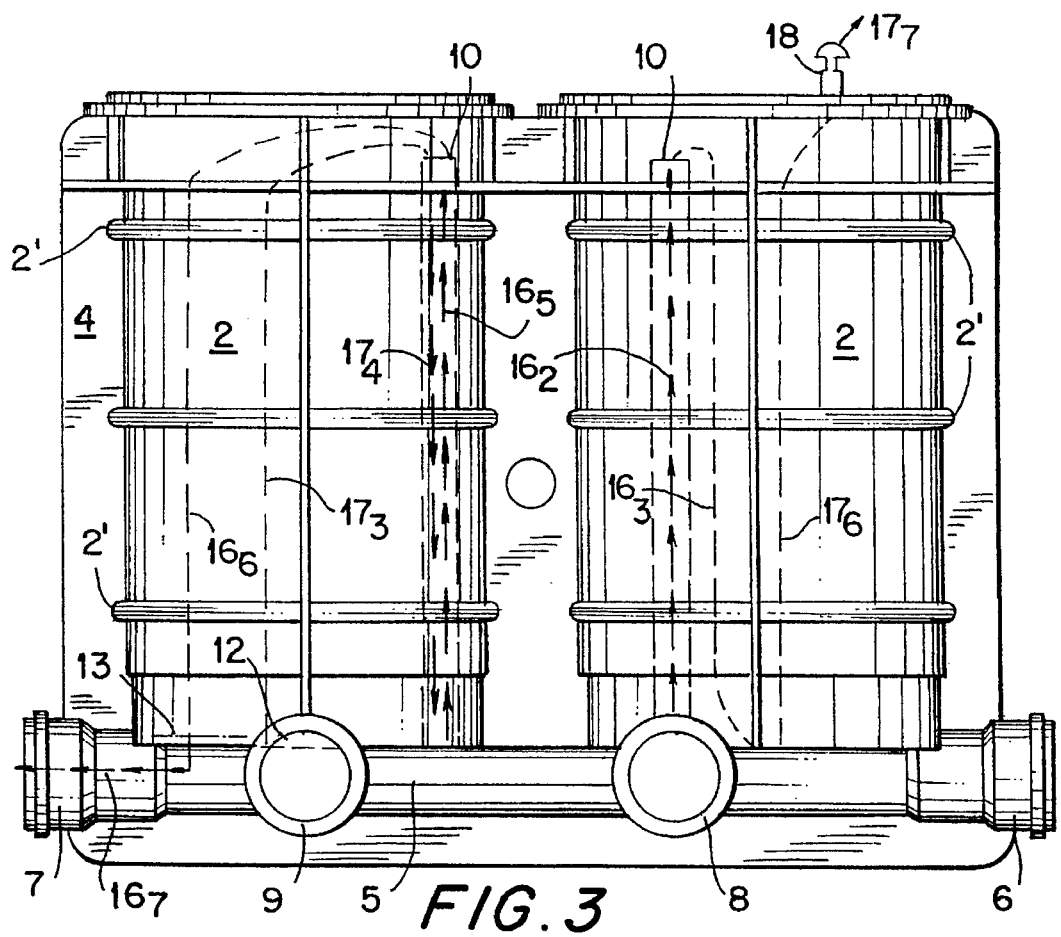
FIG. 3 is a view only of the monoblock piece embodying the two filtering sets, the communication ducts between the same, the interconnection ducts to the water inlet and outlet nozzles and the water outlet nozzles for retro-cleaning and purification, and the nozzles themselves.
Figure 4:
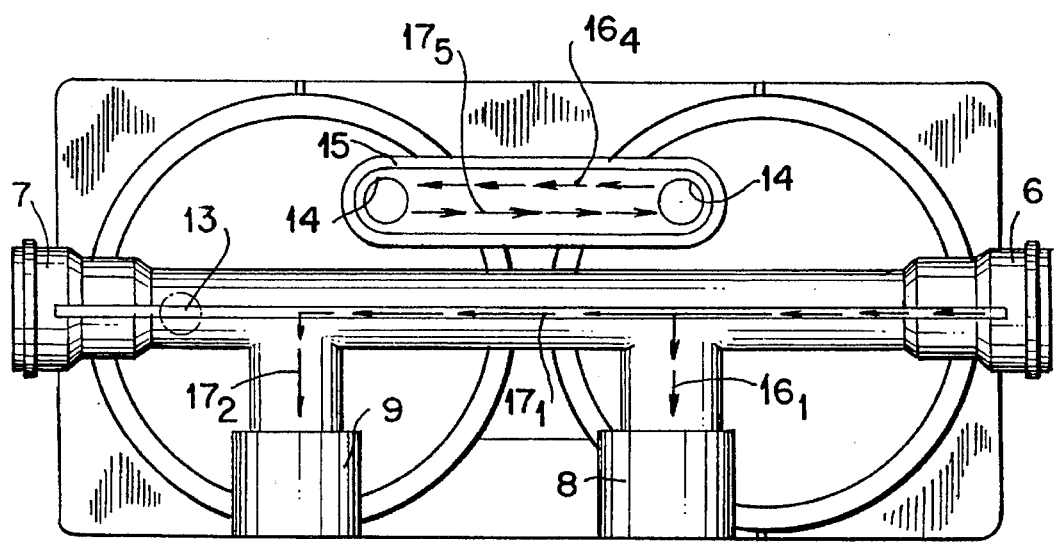
FIG. 4 is a bird's eye view of said monoblock piece.
Figure 6:
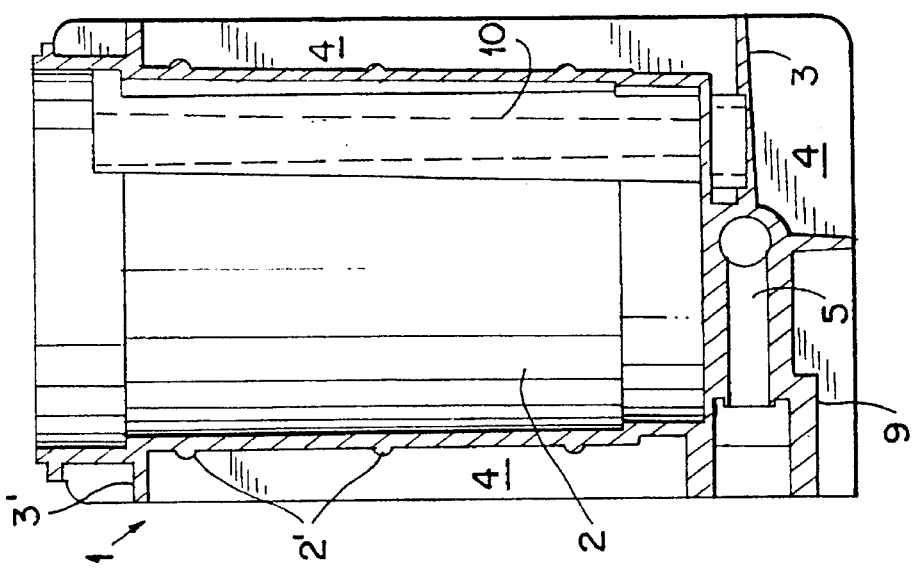
FIGS. 5 and 6 are cross-sections of the piece respectively according to lines A—A and B—B of the previous figure.
Figure 5:
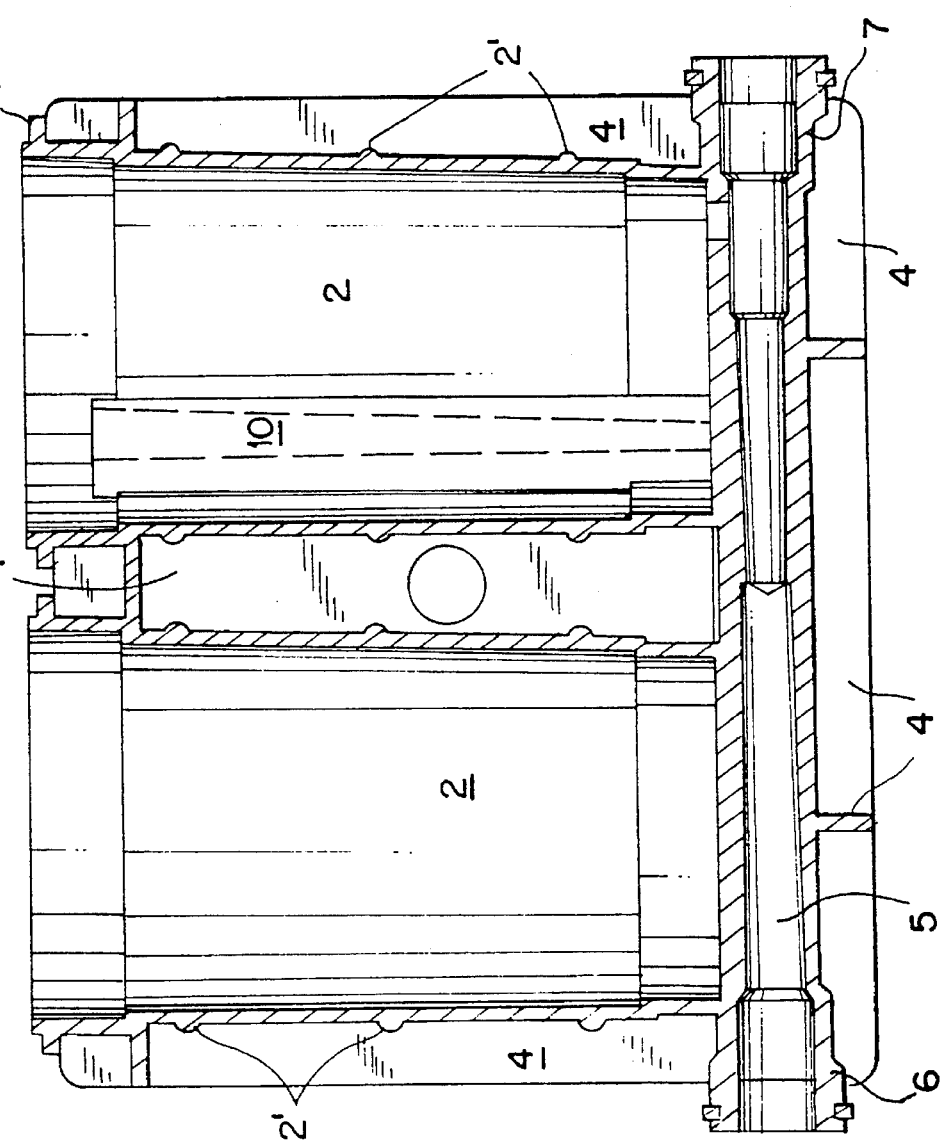

A feed inlet slit 12 is arranged in the bottom of one of the chambers 2 for the purifying operation, e.g., the right chamber 2 in FIG. 2. The bottom of the right chamber as shown in FIG. 2 also includes a hole 13 which functions as the chamber water outlet during the retro-cleaning operation. An aperture 14 is aligned with the vertical duct 10 in one of the chambers 2 (the right chamber in FIG. 2) to enable fluid communication between that chamber 2 through a duct 15 connecting to the aperture 14. The other chamber (the left chamber in FIG. 2) has an aperture 14 opening into the bottom thereof. The water path during purifying operation is denoted by reference numeral 17 and the water path during retro-cleaning operation is denoted by reference numeral 16.

In the purifying mode of operation (directional arrows 17), water to be purified $17_1$ enters the inflow duct 6 and is passed $17_2$ via open nozzle 9 into a bottom of one of the chambers 2 through slit 12 to be filtered therein as it proceeds upward $17_3$ through the filter bed. The water rises until it reaches the top of the filter bed and then passes downward $17_4$ through the vertical tube 10 and hole 14 aligned therewith into duct 15. From duct 15, the water is passed $17_5$ into a bottom of the filter bed in the other chamber 2 whereupon it is filtered again as it rises $17_6$. The twice-purified water is removed from the chamber $17_7$ through the upper aperture 18 in the lid 11 of this chamber.

During retro-cleaning operation represented by directional arrows 16, nozzle 8 is opened and nozzle 9 is closed. Water entering duct 6 is passed $16_1$ via nozzle 8 directly into the vertical tube 10 and flows upward therein $16_2$ to be released at the top of the filter bed. The water flows in a reverse direction $16_3$ through the filter bed to clean the same and is then released from the chamber through hole 14 into duct 15 to be passed $16_4$ to the other chamber. From duct 15, the water flows upward $16_5$ through the vertical tube 10 in the second chamber to be released above the filter bed therein. The water flows in a reverse direction $16_6$ through this filter bed to clean the same and is then released from the chamber $16_7$ through hole 13 to be flushed out of outflow duct 7.

I claim:

1. A filter apparatus, comprising a machine-made, cast or injected unitary, monoblock structure including first and second hollow body filter housings, each of said housings having a substantially cylindrical shape and each of said first and second housings containing a filter element therein, support means for supporting said first and second filter housings in said structure, an inlet nozzle, an outlet nozzle, and nozzles for retro-cleaning and purification, duct means for enabling fluid communication between said first filter housing, said second filter housing, said inlet nozzle, said outlet nozzle, and said nozzles for retro-cleaning and purification, and a vertical duct arranged in each of said filter housings, said vertical ducts being coupled to said duct means, and lids for covering said filter housings, said lids being machine-made, cast or injected unitary, monoblock structures.

2. The filter apparatus of claim 1, wherein said support means comprise reinforcing ribs arranged on peripheral surfaces of said filter housings, a first rectangular, horizontal plate connected to a lower portion of said filter housings, a second rectangular, horizontal plate arranged parallel to said first plate and connected to an upper portion of said filter housings, and vertical plates extending between said first and second horizontal plates.

3. The filter apparatus of claim 2, wherein said vertical plates are connected to said first and second horizontal plates.

4. The filter apparatus of claim 1, wherein one of said lids includes a purified water outlet aperture.

5. The filter apparatus of claim 1, wherein said duct means comprise a tube passing between said first filter housing and said second filter housing, said vertical duct in said first filter housing being coupled to said tube.

* * * * *